(12) United States Patent
Pincu et al.

(10) Patent No.: US 7,612,470 B2
(45) Date of Patent: Nov. 3, 2009

(54) SYSTEM FOR PROVIDING POWER OVER ETHERNET THROUGH A PATCH PANEL

(75) Inventors: David Pincu, Holon (IL); Dror Korcharz, Bat Yam (IL)

(73) Assignee: Microsemi Corp.—Analog Mixed Signal Group Ltd., Hod Hasharon (IL)

( * ) Notice: Subject to any disclaimer, the term of this patent is extended or adjusted under 35 U.S.C. 154(b) by 850 days.

(21) Appl. No.: 11/261,705

(22) Filed: Oct. 31, 2005

(65) Prior Publication Data

US 2006/0063509 A1    Mar. 23, 2006

Related U.S. Application Data

(63) Continuation-in-part of application No. 10/344,386, filed on Dec. 31, 2002, now Pat. No. 7,046,983, which is a continuation-in-part of application No. 10/218,739, filed on Aug. 13, 2002, now Pat. No. 7,327,743, which is a continuation of application No. 09/365,584, filed on Aug. 2, 1999, now Pat. No. 6,473,608, which is a continuation-in-part of application No. 09/293,343, filed on Apr. 16, 1999, now Pat. No. 6,643,566.

(60) Provisional application No. 60/625,567, filed on Nov. 8, 2004, provisional application No. 60/644,002, filed on Jan. 18, 2005, provisional application No. 60/115,628, filed on Jan. 12, 1999.

(51) Int. Cl.
*H02J 1/00* (2006.01)

(52) U.S. Cl. ..................................................... 307/85

(58) Field of Classification Search ................. 307/156, 307/85
See application file for complete search history.

(56) References Cited

U.S. PATENT DOCUMENTS

| | | | |
|---|---|---|---|
| 6,473,608 B1 | 10/2002 | Lehr et al. | 455/402 |
| 6,643,566 B1 | 11/2003 | Lehr et al. | 700/286 |
| 7,455,527 B2 * | 11/2008 | Nordin et al. | 439/49 |
| 2003/0099076 A1 | 5/2003 | Elkayam et al. | 361/90 |
| 2005/0245127 A1 | 11/2005 | Nordin et al. | 439/540.1 |

OTHER PUBLICATIONS

Internation Search Report, Apr. 6, 2006, Pinchu.
Written Opinion Parallel PCT case, Apr. 6, 2006.

* cited by examiner

*Primary Examiner*—Robert L. DeBeradinis
(74) *Attorney, Agent, or Firm*—Simon Kahn

(57) ABSTRACT

A system for providing power over Ethernet comprising: a plurality of means for receiving a current limited power signal, each of the means receiving a unique current limited power signal; a plurality of means for connecting one end of a cable, the cable comprising a plurality of twisted wire pairs, each of the cables providing a data communication and power path to a particular node connecting jack; a plurality of connectors each for connecting one end of a patch cable, the plurality of connectors being each operatively connected by pairs of conductors to a unique one of the plurality of means for connecting one end of a cable to allow for data communication between the patch cables and the cables; and a plurality of means for injecting the received current limited power signal onto at least one of the pairs of conductors.

45 Claims, 12 Drawing Sheets

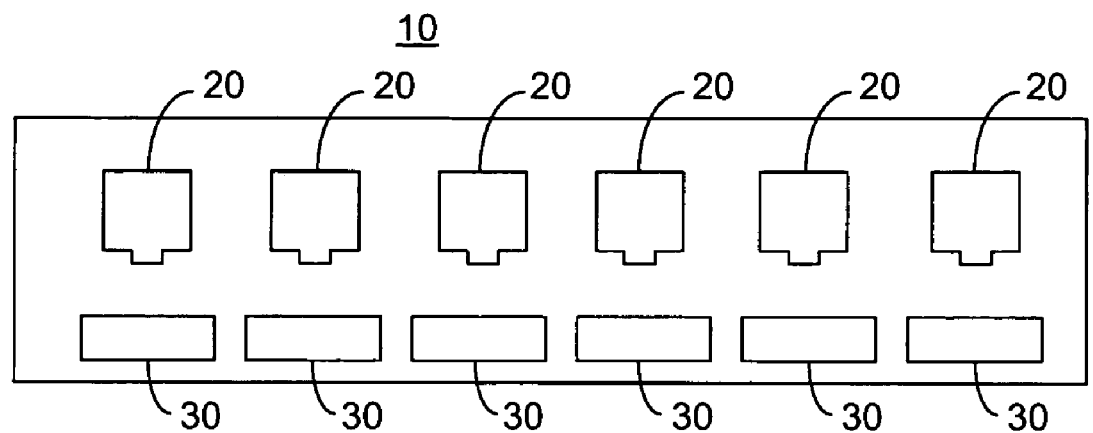
Fig. 1a  *Prior Art*
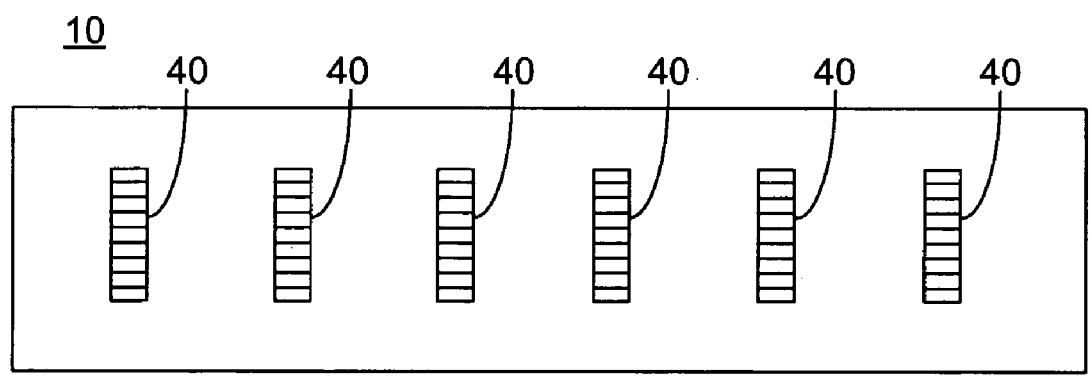
Fig. 1b  *Prior Art*

SYSTEM FOR PROVIDING POWER OVER ETHERNET THROUGH A PATCH PANEL

CROSS-REFERENCE TO RELATED APPLICATIONS

This application claims priority from U.S. Provisional Patent Application Ser. No. 60/625,567 filed Nov. 8, 2004 entitled "System for Providing Power Over Ethernet Through a Patch Panel"; U.S. Provisional Patent Application Ser. No. 60/644,002 filed Jan. 18, 2005 entitled "System for Providing Power Over Ethernet Through a Patch Panel"; and is a continuation in part of U.S. patent application Ser. No. 10/334,386 filed Dec. 31, 2002 entitled "Integral Board and Module for Power Over LAN" now U.S. Pat. No. 7,046,983, which is a continuation in part of U.S. patent application Ser. No. 10/218,739 filed Aug. 13, 2002 entitled "Structure Cabling System" now U.S. Pat. No. 7,327,743, which is a continuation of application Ser. No. 09/365,584 entitled "Structure Cabling System" filed Aug. 2, 1999 now U.S. Pat. No. 6,473,608, which is a continuation in part of U.S. patent application Ser. No. 09/293,343 filed Apr. 16, 1999 entitled "System for Power Delivery Over Data Communication Cabling Infrastructure" now U.S. Pat. No. 6,643,566 which claims priority from U.S. Provisional Patent Application Ser. No. 60/115,628 filed Jan. 12, 1999 entitled "Delivery and Distribution of Power in Addition to the Data Communication Over the Local/Wide Area Network Infrastructure". This application is related to co-filed U.S. patent applications Ser. No. 11/261,704 entitled "Rack Level Power Management for Power Over Ethernet" now U.S. Pat. No. 7,441,133; Ser.No. 11/261,707 entitled "Rack Level Power Management" now U.S. Pat. Ser.No. 7,400,062; and Ser.No. 11/261,706 entitled "System and Method for Obtaining Configuration Information Based on Detected Parameters of a Remote Device" now U.S. Pat. No. 7,500,121. The entire contents of each of the above patents and applications are incorporated herein by reference.

BACKGROUND OF THE INVENTION

The present invention relates to the field of power over Ethernet, and more particularly to a system for providing power over Ethernet functionality via a power ready patch panel.

The growth of local and wide area networks based on Ethernet technology has been an important driver for cabling offices and homes with structured cabling systems having multiple twisted wire pairs. The ubiquitous local area network, and the equipment which operates thereon, has led to a situation where there is often a need to attach a network operated device for which power is to be advantageously supplied by the network over the network wiring. Supplying power over the network wiring has many advantages including, but not limited to; reduced cost of installation; centralized power and power back-up; and centralized security and management.

Several patents addressed to this issue exist including: U.S. Pat. No. 6,473,608 issued to Lehr et al., whose contents-are incorporated herein by reference and U.S. Pat. No. 6,643,566 issued to Lehr et al., whose contents are incorporated herein by reference. Furthermore a standard addressed to the issue of powering remote devices over an Ethernet based network has been published as IEEE 802.3af-2003, whose contents are incorporated herein by reference.

A patch panel is a mounted hardware unit comprising an assembly of port locations used to connect incoming and outgoing lines of a local area network (LAN) or other communication, electronic or electrical system. In a LAN, a patch panel serves as a sort of static switchboard, using cables to interconnect nodes to a switch/server of the local area network. A patch panel typically uses a jumper cable called a patch cord or a patch cable to create each interconnection. A typical prior art patch panel has connectors (usually on the back) for the cable runs to the stations or nodes. Various type of connectors are supplied including AT&T 110 punch down and Krone type insulation displacement connection (IDC). Each of those connectors exhibits a hard wired connection to a socket on the front of the patch panel, which typically comprises an RJ-45 socket. The RJ-45 socket on the front provides a spot to plug in a patch cable that typically connects to switch/hub equipment. In such an embodiment each RJ-45 on the front represents a convenient connection point to a specific node. A patch panel may also be utilized to represent switch/hub equipment, with each front connection representing a convenient connection point to a specific port of switch/hub equipment.

Power over Ethernet as described in the above mentioned standard envisions the use of midspan power sourcing equipment to supply power to nodes, known as powered devices (PD). The use of midspan power sourcing equipment does not obviate the need for patch panels. Thus, a typical installation utilizing midspan power sourcing equipment comprises both midspan power sourcing equipment and patch panels in a telecommunication rack. Such an installation is wasteful of rack space, and is less than optimal. Furthermore, a midspan is application specific whereas a patch panel is generic, not being designed for any specific application.

What is needed therefore, and is not provided by the prior art, is a means of providing midspan power sourcing equipment functionality in combination with a patch panel.

SUMMARY OF THE INVENTION

Accordingly, it is a principal object of the present invention to overcome the disadvantages of prior art. This is provided in the present invention by a power ready patch panel and a separate power sourcing device (PSD). The PSD outputs a current limited power for each port to be powered. The current limited power outputs of the PSD are connected to the power ready patch panel, and the power ready patch panel connects to the current limited power to twisted pair wiring for connection to the PD. Preferably, the PSD further provides information regarding powering status of each port to the power ready patch panel for display by an indicating means, such as one or more dedicated LEDs per port. In an exemplary embodiment the PSD receives a type indication from the power ready patch panel. The type indication is indicative of the type of port powering. In one embodiment, the types of port powering comprise spare pair powering, data pair powering, and high powering comprising both data and spare pair powering. In another embodiment the type of port powering further comprises personalization information indicative of vendor specific features to be supported by the PSD in cooperation with the power ready patch panel. Optionally, the types comprise an indication that the port is to be connected to a PD, or is left unconnected. In one embodiment, the type indication is provided by a resistance of a pre-determined range.

In an exemplary embodiment, a plurality of PSD's receive power from one or more uninterruptible power source (UPS). A high density PSD provides up to 144 ports of power, which is sufficient to power ports of a plurality of power ready patch panels. In one embodiment the high density PSD is designed to be rack mounted and occupies 1 Unit Height (1 U). In another embodiment the PSD is designed to share a rack location with the power ready patch panel, the power ready patch panel being located in front of the PSD on the same horizontal rack location.

In an exemplary embodiment a plurality of PSDs are provided, with power being allocated from a power source in accordance with a management unit. The management unit may be located within one of the PSDs or as a separate unit. Power management functionality is thus provided on a rack level for the plurality of PSDs.

The invention provides for a power ready patch panel comprising: a plurality of means for receiving a current limited power signal, each of the means receiving a unique current limited power signal; a plurality of means for connecting one end of a cable, the cable comprising a plurality of twisted wire pairs, each of the cables providing a data communication and power path to a particular node connecting jack; a plurality of connectors each for connecting one end of a patch cable, the plurality of connectors being each operatively connected by pairs of conductors to a unique one of the plurality of means for connecting one end of a cable to allow for data communication between the patch cables and the cables; and a plurality of means for injecting the received current limited power signal onto at least one of the pairs of conductors.

In one embodiment the power ready patch panel further comprises a status indicator indicating a status of power delivery via the current limited power signal. In one further embodiment the status indicator comprises at least one LED associated with each of the plurality of means for connecting one end of a cable. In another further embodiment the status indicator displays an indication of at least one of power supplied to a node connected to the node connecting jack, an overload condition, and a short circuit condition.

In one embodiment at least one of the plurality of means for connecting one end of a cable comprises one of a 66 punch down, 110 punch down, BIX punch down, a Krone IDC and an 8 contact insulation displacement connector. In another embodiment at least one of the plurality of connectors for connecting one end of a patch cable comprises an RJ-45 socket.

In one embodiment the power ready patch panel meets the definition of connecting hardware according to the TIA/EIA 568 standard. Preferably, the power ready patch panel performs in accordance with one of category 5, category 5e and category 6 requirements of the TIA/EIA 568 standard.

In one embodiment at least one of the means for injection comprises one of a transformer and an inductor. In another embodiment at least one of the received current limited power signals is injected by the respective means for injecting onto pairs of conductors not utilized for data communication.

In one embodiment at least one of the received current limited power signals is injected by the respective means for injecting onto pairs of conductors utilized for data communication. In another embodiment the power ready patch panel further comprises a type indicator operable to indicate a type of operation to a source of the received plurality of current limited power signals. In one further embodiment the type indicator comprises a pre-determined resistance, the type of operation being detectable from the value of the predetermined resistance. In another further embodiment the type of operation comprises at least one of spare pair powering, data pair powering, a combination of data pair and spare pair powering, a disabled condition and a priority. In yet another further embodiment the type of operation comprises an indication of vendor specific features to be supported by the source of the plurality of current limited power signals.

In one embodiment at least two of the plurality of means for receiving a current limited power are constituted of a single detachable connector. In another embodiment the current limited power signals are in accordance with IEEE 802.3af.

Independently, the invention provides for a system for providing power over Ethernet comprising: a power sourcing device, the power sourcing device providing a plurality of current limited power signals; and a power ready patch panel detachably connected to at least one of the plurality of current limited power signals, the power ready patch panel comprising: a plurality of ports for connecting a node connecting cable, the node connecting cable comprising a plurality of twisted wire pairs providing a data communication and power path to a particular node connecting jack; a plurality of ports for connecting a patch cable, each of the plurality of ports for connecting a patch cable being associated with a unique one of the plurality of ports for connecting a node connecting cable; and an operative connection between the detachably connected at least one current limited power signal and at least one of the plurality of ports for connecting a node connecting cable.

In one embodiment the system further comprises a means for indicating a status of the connected at least one current limited power signal. Preferably, the means for indicating status comprises at least one LED associated with each of the plurality of ports for connecting a node connecting cable. In another embodiment the system further comprises a status indicator indicating a status for each of the plurality of ports for connecting a node connecting cable, the indicator displaying an indication of at least one of power supplied, no power supplied, an overload condition and a short circuit condition.

In one embodiment each of the plurality of ports for connecting a node connecting cable comprises one of a 66 punch down, 110 punch down, BIX punch down, a Krone IDC and an 8 contact insulation displacement connector. In another embodiment each of the plurality of ports for connecting a patch cable comprises an RJ-45 socket.

In one embodiment the power ready patch panel meets the definition of connecting hardware according to the TIA/EIA 568 standard. Preferably, the power ready patch panel performs in accordance with one of category 5, category 5e and category 6 requirements of the TIA/EIA 568 standard.

In one embodiment the system further comprises one of a transformer and an inductor, the operative connection comprising the one of a transformer and an inductor. In another embodiment the operative connection connects the connected at least one current limited power signal to twisted wire pairs of the node connecting cable not providing a data communication path.

In one embodiment the operative connection connects the connected at least one current limited power signal to twisted wire pairs of the node connecting cable providing a data communication path. In another embodiment the power ready patch panel further comprises a type indicator operable to indicate a type of operation to the power sourcing device. In one further embodiment the type indicator comprises a pre-determined resistance detectable by the power sourcing device, the type of operation being encoded by the value of the pre-determined resistance. In another further embodiment the type of operation comprises at least one of spare pair powering, data pair powering, a combination of data pair and spare pair powering, a disabled condition and a priority. In yet another further embodiment the type of operation comprises an indication of vendor specific features, the power sourcing device being operable to deliver the vendor specific feature in accordance with the indication.

In one embodiment the system further comprises a plurality of detachable connections between the power sourcing device and the power ready patch panel, each of the plurality of detachable connections being associated with a unique one of the plurality of current limited power signals, wherein at least two of the plurality of connections are at least partially constituted of a single detachable connector. In another embodiment the power sourcing device is operable in accordance with IEEE 802.3af.

Independently the invention provides for a power sourcing device for use with a power ready patch panel, the power sourcing device comprising: a plurality of current limited power signals; and an output signal providing display information regarding each of the plurality of current limited power signals.

In one embodiment the information comprises one of an overload condition, a normal power supply condition, and a short circuit condition. In another embodiment the power sourcing device further comprises a type indication receiver operable to obtain a type of operation of the power ready patch panel. In one further embodiment the type of operation is at least one of: spare pair powering; data pair powering; a combination of data pair and spare pair powering; a disabled condition; and a priority, the power sourcing device being operable responsive to the obtained type operation. In another further embodiment the type indication is indicative of vendor specific features, the power sourcing device being operable in accordance with the indication.

In one embodiment the plurality of current limited power signals are each in accordance with IEEE 802.3af. In another embodiment the output signal is sufficient to display the display information on a supplied display.

Independently the invention provides for a method of powering nodes in a data network, the method comprising: detachably receiving a current limited power signal; connecting one end of a cable comprising a plurality of twisted wire pairs, the cable providing a data communication path to a node connecting jack; connecting one end of a patch cable to provide data communication for the node connecting jack; operatively connecting the connected one end of a patch cable to the connected one of a cable; and operatively connecting the detachably received current limited power to the connected one end of a cable thereby providing power to the node.

In one embodiment the method further comprises indicating a status of the received current limited power signal. In one further embodiment the status is at least one of power supplied towards the node connecting jack, no power supplied towards the node connecting jack, an overload condition and a short circuit condition.

In one embodiment the method further comprises signaling to a source of the received current limited power a type indication. Preferably, the method further comprises: providing a source of the received current limited power; and operating the provided source responsive to the signaled type indication.

Independently the invention provides for a method of flexibly providing power in a structured cabling system, the method comprising: providing a source of a plurality of current limited power signals; providing a power ready patch panel, the power ready patch panel providing detachable connections for the plurality of current limited power signals, the power ready patch panel further exhibiting a plurality of ports for connecting a node connecting cable and a plurality of ports for connecting a patch cable, each of the plurality of ports for connecting a patch cable being operatively connected via pairs of conductors to a unique one of the plurality of ports, each of the detachable connections being operatively connected to inject the detachably connected current limited power signal to at least one of the pairs of conductors; connecting each of the plurality of ports of the provided power ready patch panel to a unique node connecting jack; connecting each of the plurality of ports for connecting a cable to a data communication path thereby providing data communication for a node connected to the node connecting jack; and detachably connecting the providing plurality of current limited power signals to the detachable connection, thereby providing power to the node connected to the node connecting jack without affecting data communication.

Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings:

FIG. 1a illustrates a front view of a patch panel known to the prior art;

FIG. 1b illustrates a rear view of the patch panel of FIG. 1b;

DETAILED DESCRIPTION OF PREFERRED EMBODIMENTS

Figure 2:
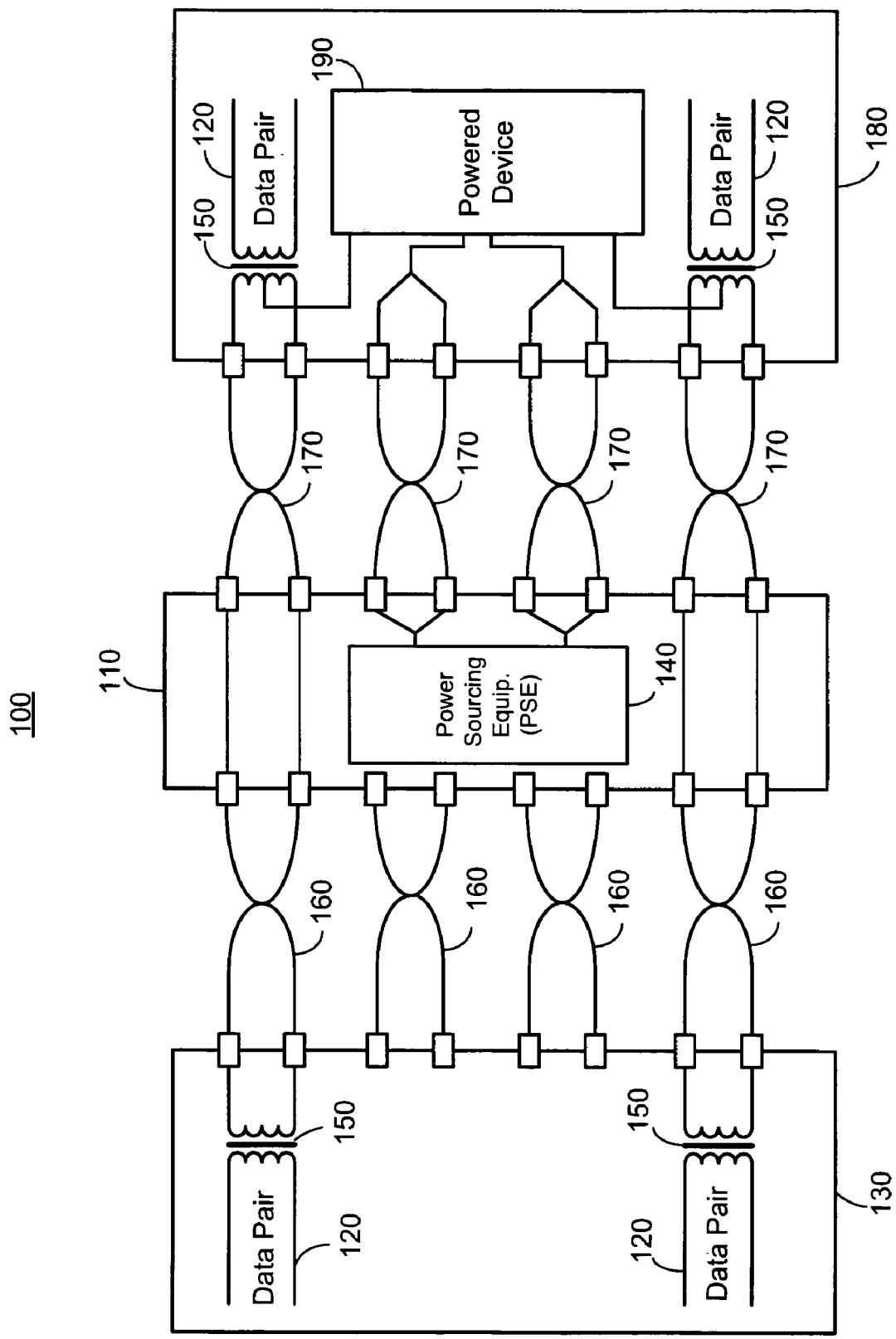
FIG. 2 illustrates a high level block diagram of a network configuration for remote powering from a midspan power insertion equipment known to the prior art.

The present embodiments enable a system for powering nodes over structured cabling by providing a power ready patch panel and a power sourcing device (PSD). The PSD outputs a current limited power for each node to be powered and provides interrogation, optional classification, power management and optional reporting, preferably in conformity with IEEE 802.3af. In an exemplary embodiment, a plurality of PSDs provide power for a plurality of power ready patch panels, and at least one PSD provides rack level power management. The power ready patch panel preferably comprises a connection for receiving power from the power sourcing device, a plurality of ports for connecting switch/hub equipment, a plurality of ports for connecting nodes and a status indicator for each port. Each port for connecting switch/hub equipment is associated with a unique port for connecting a node. Preferably, the power ready patch panel further provides a type indication for each port or group of ports as defined by the connection to the PSD, the type indication being for connection to the associated PSD. The type indication is representative of the powering type of the port, and in an exemplary embodiment may be indicative of spare pair powering, data pair powering, a combination of spare pair powering and data pair powering, or the port being disabled. In another embodiment the type of port powering further comprises personalization information indicative of vendor specific features to be supported by the PSD in cooperation with the power ready patch panel. In another embodiment the type indication may be representative of a priority of the associated port or group of ports, the priority being determined by a prioritization algorithm.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

FIG. 1a illustrates a front view of a patch panel 10 known to the prior art, comprising ports 20 for connecting switch/hub equipment and labeling tabs 30. Typically, ports 20 are located on the front face of patch panel 10. Ports 20 are herein called ports for connecting switch/hub equipment, however this is not meant to be limiting in any way. Ports 20 may be used to connect to other patch panels or other equipment without exceeding the scope of the invention. Typically, ports 20 comprise RJ-45 jacks, however this is not meant to be limiting in any way. RJ-21 jacks, or any other connector, may be used without exceeding the scope of the invention. A plurality of ports 20 are typically provided, with 6 ports 20 being shown for sake of illustration. Any number of ports 20 may be provided, with patch panels of 16, 24 and 48 ports being most common. Labeling tabs 30 are used to identify the node attached to the port as will be explained further hereinto below. Labeling tabs 30 provide organizational functionality to equipment racks.

FIG. 1b illustrates a rear view of patch panel 10 of FIG. 1b providing a plurality of ports 40. Each port 40 is connected to, and associated with, a unique port 20 as described above in relation to FIG. 1a. Ports 40 are typically designated for connecting to a node connecting cable, the node connecting cable comprising a plurality of twisted wire pairs. In an exemplary embodiment ports 40 comprise means for connecting one end of a node connecting cable such as a 66 punch down, 110 punch down, BIX punch down, Krone IDC or 8 contact insulation displacement connector.

FIG. 2 illustrates a high level of a block diagram of a network configuration 100 for remote powering from a midspan power insertion equipment 110 known to the prior art. Network configuration 100 comprises: a switch/hub equipment 130 comprising a first and second data pair 120 and a first and second transformer 150; a first through fourth twisted pair connection 160; a midspan power insertion equipment 110 comprising a power sourcing equipment (PSE) 140; a first through fourth twisted pair connection 170; and a powered end station 180 comprising a third and fourth transformer 150, a third and fourth data pair 120, and a PD 190.

The primary of each of first and second transformers 150 is associated with respective data pairs 120. The output leads of the secondary of first and second transformers 150 are connected, respectively, to a first end of first and second twisted pair connections 160. The second end of first and second twisted pair connections 160 are connected as a straight through connection through midspan power insertion equipment 110 to a first end of first and second twisted pair connections 170, respectively. A second end of first and second twisted pair connections 170 are connected to the primary of third and fourth transformer 150, respectively, located within powered end station 180. The secondary of each of third and fourth transformers 150 is associated with respective third and fourth data pairs 120. Third and fourth twisted pair connections 160 are shown connected between switch/hub equipment 130 and midspan power insertion equipment 110, however no internal connection to either third of fourth twisted pair connection 160 is made. In an alternative embodiment (not shown), DC blocking capacitors may be placed between the second end of third and fourth twisted pair connections 160 and third and fourth twisted pair connections 170 allowing for passage of high speed data while blocking DC current origination at PSE 140 from reaching switch/hub equipment 130.

A first output of PSE 140 is connected to both leads of one end of third twisted pair connection 170 and a second output of PSE 140, acting as a return, is connected to both leads of one end of fourth twisted pair connection 170. The second end of both leads of third and fourth twisted pair connections 170 respectively, are connected to first and second power inputs of PD 190. The center tap of the primary of each of third and fourth transformer 50 is connected to respective inputs of PD 190 to allow for alternate operation utilizing data pair powering known to those skilled in the art.

In operation PSE 140 of midspan power insertion equipment 110 supplies power to powered end station 180 over third and fourth twisted pair connections 170, with data being supplied from switch/hub equipment 130 over first and second twisted pair connections 160 through midspan power insertion equipment 110 to first and second twisted pair connections 170. Power and data are thus supplied over separate connections, and are not supplied over a single twisted pair connection.

Figure 3:
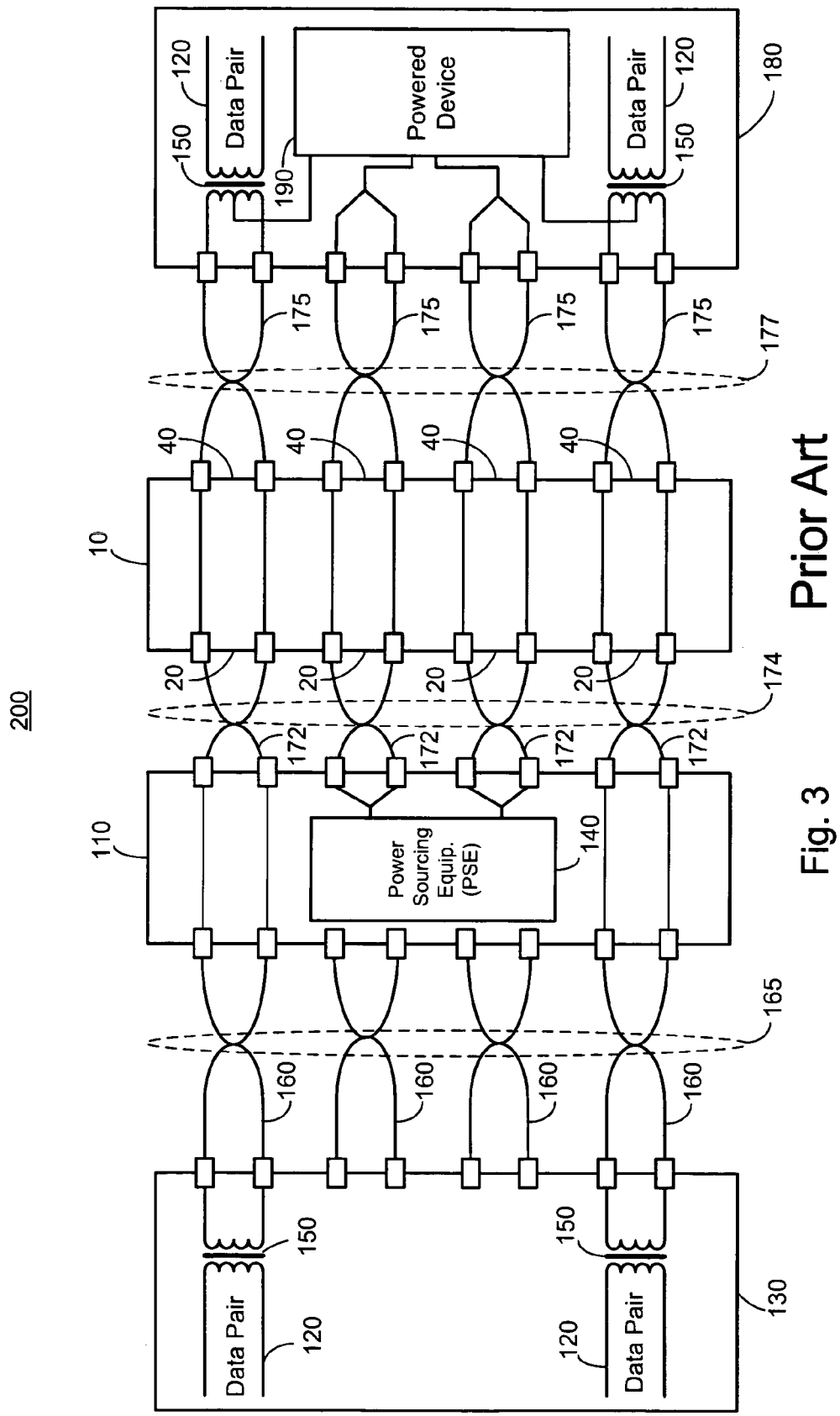
FIG. 3 illustrates a high level block diagram of a network configuration for remote powering from a midspan power insertion equipment comprising a patch panel known to the prior art.

FIG. 3 illustrates a high level block diagram of a network configuration 200 for remote powering from a midspan power insertion equipment 110 via a patch panel 10 as known to the prior art. Network configuration 200 comprises: a switch/hub equipment 130 comprising a first and second data pair 120 and a first and second transformer 150; a patch cable 165 comprising a first through fourth twisted pair connection 160; a midspan power insertion equipment 110 comprising a PSE 140; a second patch cable 174 comprising a first through fourth twisted pair connection 172; a patch panel 10 comprising ports 20 for connecting switch/hub equipment and ports 40 for connecting to a node connecting cable; a node connecting cable 177 comprising a first through fourth twisted pair connection 175; and a powered end station 180 comprising a third and fourth transformer 150, a third and fourth data pair 120, and a PD 190.

The primary of each of first and second transformers 150 is associated with respective data pairs 120. The output leads of the secondary of first and second transformers 150 are connected, respectively, to a first end of first and second twisted pair connections 160 of first patch cable 165. The second end of first and second twisted pair connections 160 are connected as a straight through connection through midspan power insertion equipment 110 to a first end of first and second twisted pair connections 172 of second patch cable 174, respectively. A second end of first and second twisted pair connections 172 are connected to a port 20 of patch panel 10, which connects via a straight through connection of patch panel 10 to port 40 and from port 40 to a first end of first and second twisted pair connections 175 of node connecting cable 177. A second end of first and second twisted pair connections 175 is connected to the primary of third and fourth transformer 150, respectively, located within powered end station 180. The secondary of each of third and fourth transformers 150 is associated with respective third and fourth data pairs 120. Third and fourth twisted pair connections 160 are shown connected between switch/hub equipment 130 and midspan power insertion equipment 110, however no internal connection to either third of fourth twisted pair connection 160 is made. In an alternative embodiment, DC blocking capacitors may be placed between the second end of third and fourth twisted pair connections 160 and third and fourth twisted pair connections 172 allowing for passage of high speed data while blocking DC current originating at PSE 140 from reaching switch/hub equipment 130.

A first output of PSE 140 is connected to both leads of one end of third twisted pair connection 172 and a second output of PSE 140, acting as a return, is connected to both leads of one end of fourth twisted pair connection 172. The second end of both leads of both third and fourth twisted pair connections 172 respectively, are connected to a port 20 of patch panel 10, which connects via a straight through connection of patch panel 10 to port 40 and from port 40 to a first end of third and fourth twisted pair connections 175. A second end of each of respective third and fourth twisted pair connections 175 is connected to first and second power inputs of PD 190. The center tap of the primary of each of third and fourth transformer 150 is connected to respective inputs of PD 190 to allow for alternate operation utilizing data pair powering known to those skilled in the art. It is to be understood that port 20 may comprise a single RJ-45 jack connecting all four twisted pairs 172 of second patch cable 174. Port 40 may comprise a single 66 punch down, 110 punch down, BIX punch down, Krone IDC or 8 contact insulation displacement connector connecting first, second, third and fourth twisted pair connections 175 of node connecting cable 177 to patch panel 10.

In an exemplary embodiment PD 190 is connected to node connecting cable 177 at a node connecting jack, the node connecting jack being installed and connected to node connecting cable 177 at an infrastructure installation phase. PD 190 may thus be connected or disconnected at the user location at the node connecting jack.

In operation network 200 operates in all respects similarly to that of network 100 of FIG. 2. Patch panel 10 acts transparently to both power and data thus supplying organizational functionality without appreciably disturbing data or power flow.

Figure 4A:
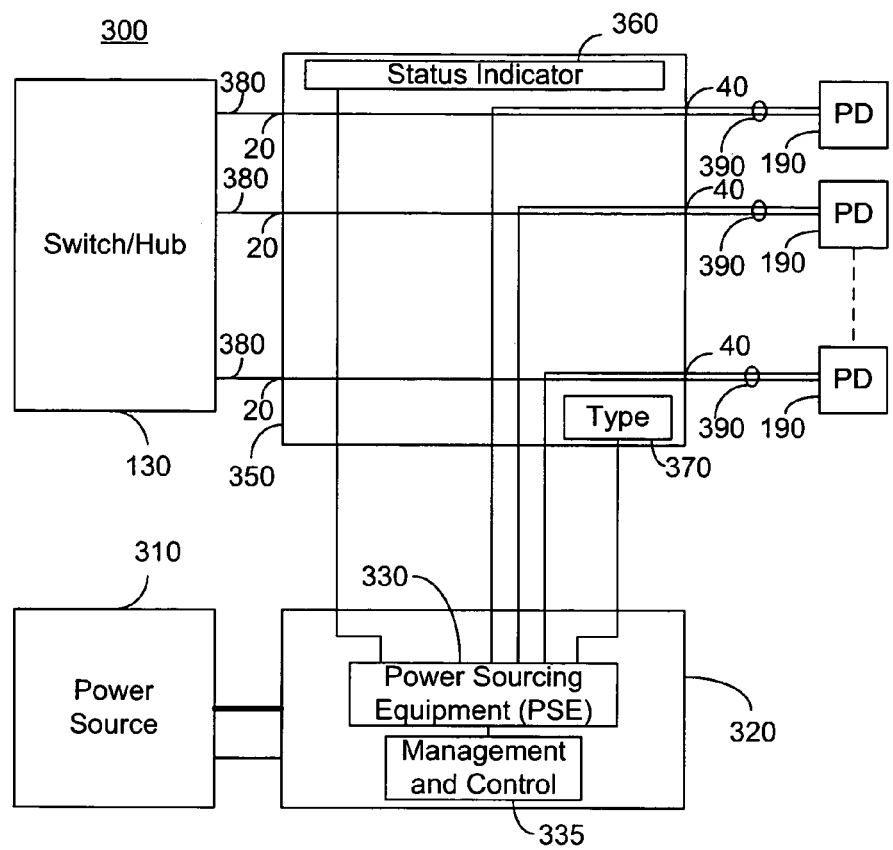
FIG. 4a illustrates a high level block diagram of an embodiment of a network configuration for remote powering from a PSD comprising a single patch panel illustrating spare pair powering in accordance with the principle of the current invention.

FIG. 4a illustrates a high level block diagram of an embodiment of a network configuration 300 for remote powering from a PSD comprising a single power ready patch panel utilizing spare pair powering in accordance with the principle of the current invention. Network configuration 300 comprises a power source 310; a PSD 320 comprising a PSE 330 and a management and control unit 335; a power ready patch panel 350 comprising a status indicator 360, a type indicator 370 and ports 20 and 40; a switch/hub equipment 130; a plurality of patch cables 380 each comprising a plurality of twisted wire pairs; a plurality of nod connecting cables 390 each comprising a plurality of twisted wire pairs; and a plurality of PDs 190. Power source 310, which in an exemplary embodiment comprises an uninterruptible power supply (UPS) is connected to PSD 320. In another embodiment, power source 310 comprises an AC/DC isolated power supply. Preferably, a data connection between power source 310 and PSD 320 is provided for synchronizing operation. Provision of the data connection further allows for a single power source 310 supporting a plurality of PSDs 320 to power on a prioritized basis in accordance with the type indication received by each PSD 320 from associated type indicator 370 as will be explained further hereinto below. PSE 330 of PSD 320 exhibits a current limited power output for each port which is to be powered. Each current limited power output further supplies identification functionality and optional classification functionality, and is monitored so that in the absence of a valid maintain power signature power is shut down after a pre-determined interval. PSE 330 further exhibits an additional output representing information regarding the status of each current limited power output. Optionally, PSE 330 exhibits a connection to type indicator 370 of power ready patch panel 350 indicating the type of operation of each port or group of ports.

Switch/hub equipment 130 exhibits a plurality of outputs each of which is connected via a respective patch cable 380 to a respective port 20 of power ready patch panel 350. Power ready patch panel 350 exhibits status indicator 360, which in an exemplary embodiment comprises a plurality of LED's each indicative of a powering status of a respective port 40. Status indicator 360 further comprises decoding and driving circuitry. In another embodiment status indicator 360 comprises a display. Status indicator 360 receives status information from the output of PSE 330 representing information regarding the status of each current limited power output of PSE 330. Type indicator 370, which in an exemplary embodiment comprises a resistance having a pre-determined value within one of a plurality of ranges, is connected to PSE 330. The output of type indicator 370 comprises an indication of the type of operation of each port or group of ports of power ready patch panel 350. In one embodiment, type indicator 370 further comprises user settable DIP switches. In yet another embodiment type indicator 370 comprises a plurality of resistances, each of the resistances being selected from one of a plurality of pre-determined values. In yet another embodiment type indicator 370 comprises a resistance and an optional memory, the memory being readable by PSE 330.

Twisted data pairs of patch cable 380 carrying data from switch/hub equipment 130 connected at respective port 20 are through connected to respective twisted pairs of node connecting cable 390 at respective port 40. In the embodiment shown, current limited power outputs of PSE 330 are connected to spare pairs of node connecting cable 390 via respective port 40. A second end of each node connecting cable 390 is connected to a respective PD 190. It is to be understood that PD 190 is contained within a powered end station, and is preferably detachably connected at a node connecting jack. For simplicity, the term PD is used throughout this document to include a powered end station connected via a node connecting jack whenever the powered end station is not specifically separately mentioned.

In operation, PSE 330 is powered by power source 310. Ports are identified, optionally classified and powered by PSE 330 which is external to power ready patch panel 350. Power management and reporting functionality are accomplished by management and control unit 335 residing in PSD 320. PSE 330 outputs control signals to status indicator 360 thus notifying the user of the status of powered ports. PSE 330 obtains information from power ready patch panel 350 via type indicator 370. In one embodiment type indicator 370 provides information indicative of the powering arrangement of power ready patch panel 350. Information may comprise an indication that powering is being done on data pairs, spare pairs or a combination of data and spare pairs as described in co-pending patent application Ser. No. 10/761,327 filed Jan. 22, 2004 entitled "High Power Architecture for Power Over Ethernet" and Ser. No. 10,893,460 filed Jul. 19, 2004 entitled "Power Supply Subsystem for Powering a Node over Communication Cabling" the contents of both of which are incorporated herein by reference. Information may also comprise an indication that power is not connected.

Information may also comprise personalization information indicative of vendor specific features to be supported by PSD 320 in cooperation with the power ready patch panel. In one embodiment, vendor specific features include one of type of status indicator 370, such as a one or bi-color LED assembly. In another embodiment vendor specific features include a preferred method of reducing power in the event of a failure of one or more components of power source 310. Thus, specific advanced software features supported by PSD 320 are enabled or disabled in response to the type of operation obtained from type indicator 320 of power ready patch panel 350.

PSD 320 is preferably detachably connected to power ready patch panel 350. In one embodiment each current limited power output of PSE 330 may be separately connected to power ready patch panel 350. Thus, a PSD 320 having a plurality of current limited power outputs may serve ports to be powered located in one or more power ready patch panels 350. In another embodiment a plurality of current limited power outputs are connected by a single cable from PSD 320 to power ready patch panel 350. For each connector, preferably a connection to type indicator 370 and status indicator 360 is supplied, exhibiting a type indication and status information associated with the current limited powers of the connector. PD 190 is in data communication with switch/hub equipment 130 through power ready patch panel 350, and receives power over spare pair wiring from PSE 330 of PSD 320 through power ready patch panel 350.

Preferably, power ready patch panel 350 meets the definition of connecting hardware according to the TIA/EIA 568 standard, published by the Telecommunications Industry Association, Arlington Va., whose entire contents are incorporated herein by reference. Further preferably power ready patch panel 350 meets the definition of at least one of category 5, category 5e and category 6 equipment according the aforementioned standard.

Figures 4B, 4C:
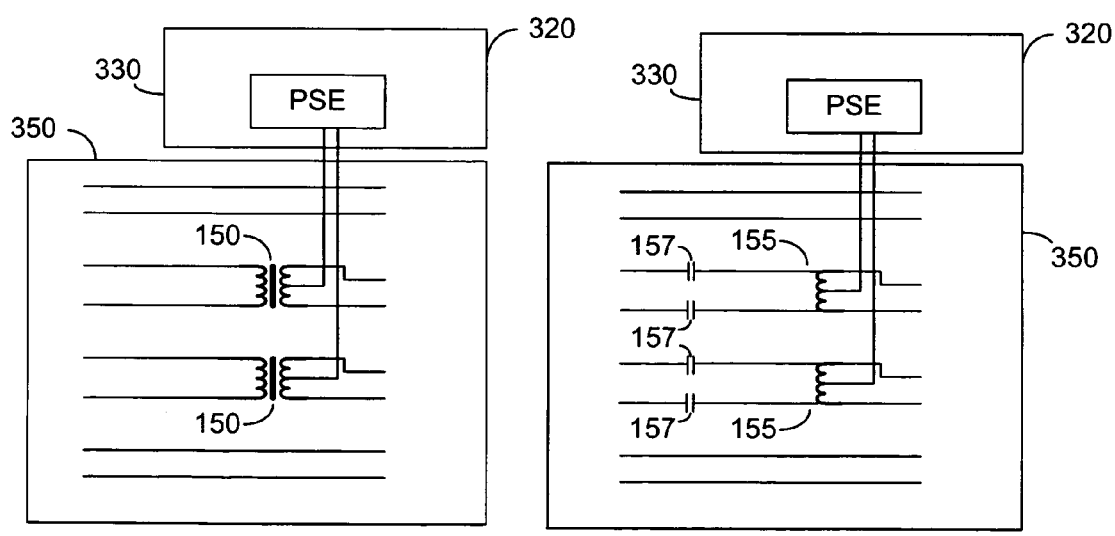
FIG. 4b illustrates a high level block diagram of data pair powering utilizing transformers in accordance with the principle of the current invention.
FIG. 4c illustrates a high level block diagram of data pair powering using a combination of capacitors and inductors in accordance with the principle of the current invention.

FIG. 4b illustrates a high level block diagram of data pair powering utilizing a transformer 150 in accordance with the principle of the current invention. In such an embodiment power ready patch panel 350 comprises a pair of data transformers 150 for each port to be powered. The current limited power output of PSE 330 is connected to the center tap of data transformers 150 of power ready patch panel 350. Power from PSE 330 is thus injected onto data pairs within power ready patch panel 350 without appreciably interfering with data transmission.

FIG. 4c illustrates a high level block diagram of data pair powering utilizing a combination of capacitors and inductors in accordance with the principle of the current invention. Power ready patch panel 350 comprises, for each port to be powered via a data pair, a pair of inductors 155, and four capacitors 157, a pair of capacitors 157 being associated with each inductor 155. The capacitors are arranged to block the flow of DC power towards switch/hub 130 (not shown). The current limited power output of PSE 330 is connected to the center tap of inductors 155 of power ready patch panel 350. Power from PSD 320 is thus injected onto data pairs within power ready patch panel 350 without appreciably interfering with data transmission.

Figure 4D:
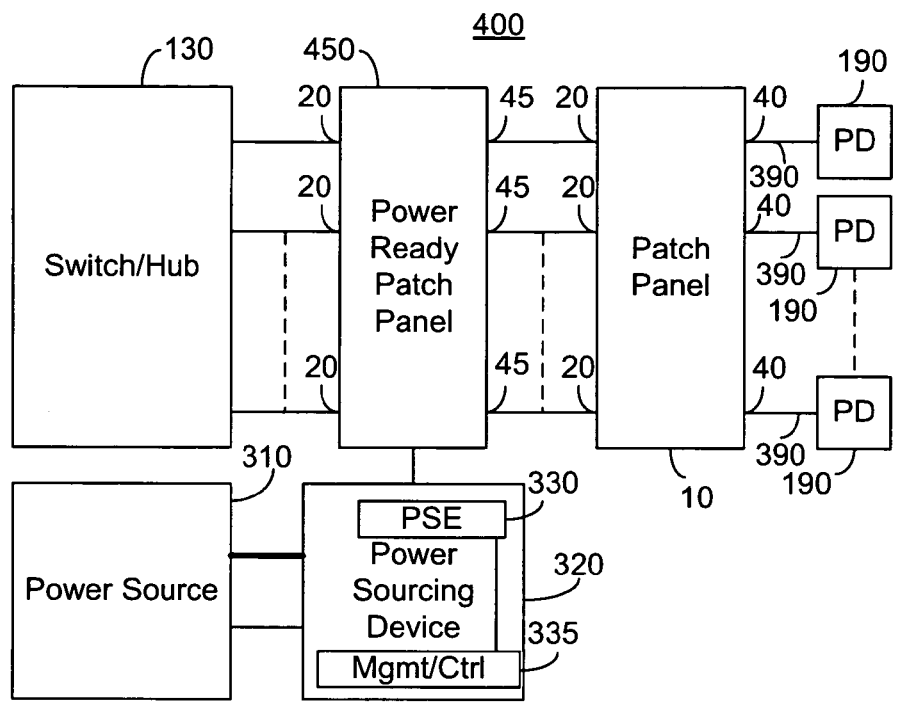
FIG. 4d illustrates a high level block diagram of an embodiment of a network configuration for powering from a PSD comprising a power ready patch panel connected via a generic patch panel in accordance with the principle of the current invention.

FIG. 4d illustrates a high level block diagram of an embodiment of a network configuration 400 for powering from a PSD 320 comprising a power ready patch panels 450 connected via a generic patch panel in accordance with the principle of the current invention. Network configuration 400 comprises: a switch/hub equipment 130; a power source 310; a PSD 320 comprising a PSE 330 and a management and control unit 335; a power ready patch panel 450 exhibiting a ports 20 and 45; a patch panel 10 exhibiting ports 20 and 40; and a plurality of PDs 190.

Power source 310 supplies power to PSD 320 and is preferably in data communication therewith. PSE 330 of PSD 320 supplies current limited power to ports of power ready patch panel 450, preferably via detachable connections. Switch/hub equipment 130 is connected by via patch cables to respective ports 20 of power ready patch panel 450. Ports 45 of power ready patch panel 450 are connected via respective patch cables to ports 20 of patch panel 10. PDs 190 are connected via twisted pair node connecting cables 390 to respective ports 40 of patch panel 10.

Power ready patch panel 450 is in all respects similar to power ready patch panel 350 as described above in relation to FIGS. 4a and 4b, with the exception that ports 40 are replaced with pluggable ports 45. In an exemplary embodiment, ports 45 comprise RJ-45 sockets. Power management and control unit 335 is shown within PSD 320 however this is not meant to be limiting in any way. Power management and control unit 335 may external without exceeding the scope of the invention. A single power management and control unit 335 may manage a plurality of PSDs 320 without exceeding the scope of the invention.

Figure 5A:
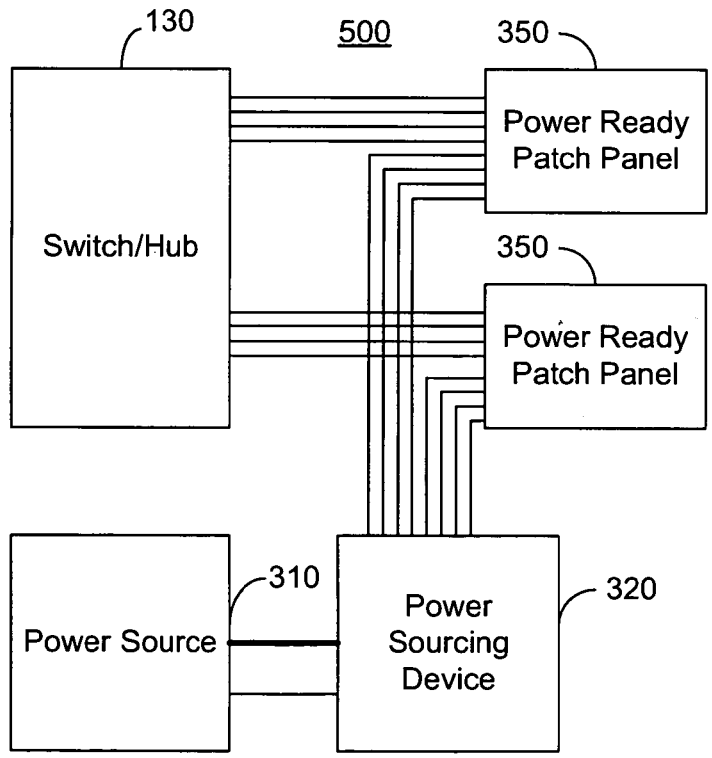
FIG. 5a illustrates a high level block diagram of an embodiment of a network configuration comprising a plurality of power ready patch panels sourced from a single PSD in accordance with the principle of the current invention.

Preferably, power ready patch panel 450 meets the definition of connecting hardware according to the TIA/EIA 568 standard, published by the Telecommunications Industry Association, Arlington Va., whose entire contents are incorporated herein by reference. Further preferably power ready patch panel 450 meets the definition of at least one of category 5, category 5e and category 6 equipment according the aforementioned standard FIG. 5a illustrates a high level block diagram of an embodiment of a network configuration 500 for remote powering from a plurality of power ready patch panels sourced from a single PSD 320 in accordance with the principle of the current invention. Network configuration 500 comprises: a power source 310, a PSD 320 and a plurality of power ready patch panels 350. The output of power source 310 is operatively connected to a power input of PSD 320. The outputs of PSD 320 are connected to respective inputs of each power ready patch panel 350. It is to be noted that a single PSD 320 can be fed to more than one power ready patch panel 350. There is no requirement that all ports of a power ready patch panel 350 receive power, and some ports of a power ready patch panel 350 may not be connected to PSD 320. Individual ports, or groups of ports of each power ready patch panel 350 may be selectively powered. In an exemplary embodiment power source 310 comprises a 54 volt UPS.

Only a single PSD 320 is shown, however this is not meant to be limiting in any way. A plurality of PSDs 320 may be provided without exceeding the scope of the invention. Furthermore, a plurality of power sources 310 may be provided without exceeding the scope of the invention. Power source 310 is in data communication with PSD 320, and preferably receives information regarding priority of PDs 180 powered through power ready patch panel 350. Power source 310 thus may provide a managed infrastructure giving priority power to power sourcing devices 320 supporting a power ready patch panel whose type indication exhibits a high priority. In an exemplary embodiment, a critical application may receive high priority powering in the event of an excess demand or power failure.

In one embodiment, each power ready patch panel 350 supports 24 ports while occupying 1 unit height (1 U). Each PSD 320 is configured to support up to 144 ports while occupying 1 U, and power source 310 powers a maximum of 4.8 kW. Such a configuration supports up to 576 ports in a single 29 U rack.

Figure 5B:
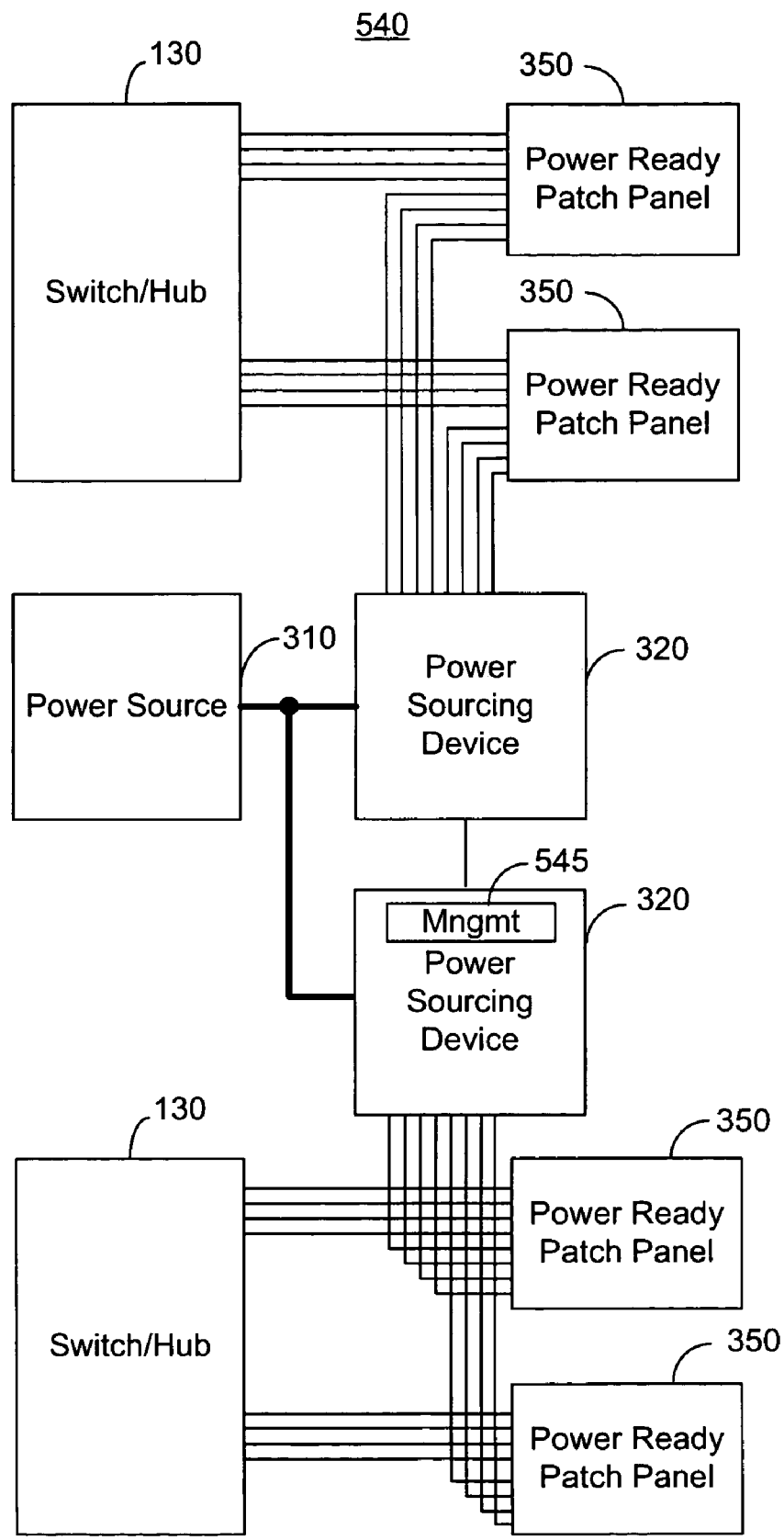
FIG. 5b illustrates a high level block diagram of an embodiment of a network configuration comprising a plurality of power ready patch panels sourced from a plurality of PSDs, at least one PSD comprising a manager supplying rack level power management in accordance with the principle of the current invention.

FIG. 5b illustrates a high level block diagram of an embodiment of a network configuration 540 for remote powering from a PSD comprising a plurality of power ready patch panels 350 sourced from a plurality of PSDs 320, at least one PSD 320 comprising a manager 545 supplying rack level power management in accordance with the principle of the current invention. Network configuration 540 comprises power source 310, a plurality of PDSs 320 and a plurality of power ready patch panels 350. The output of power source 310 is operatively connected to power each PSD 320. The outputs of each PSD 320 are connected to a respective input of a power ready patch panel 350. It is to be noted that the outputs of a single PSD 320 are fed to more than one power ready patch panel 350. There is no requirement that all ports of a power ready patch panel 350 receive power, and some ports of a power ready patch panel 350 may not be connected to a PSD 320. Individual ports or groups of ports of each power ready patch panel 350 may be selectively powered. In an exemplary embodiment power source 310 comprises a plurality of power supplies, preferably connected in an N+1 arrangement.

Only a single PSD 320 is shown as comprising manager 545, however this is not meant to be limiting in any way. Manager 545 may be provided externally from PSD 320 without exceeding the scope of the invention. Manager 545 functions to manage power allocation among all connected PSDs 320 in a manner that will be described further hereinto below. In particular manager 545 functions to ensure that a PSD 320 experiencing demand in excess of its power allocation receives an additional power allocation which is taken from a PSD 320 experiencing a power allocation in excess of demand.

Figure 5C:
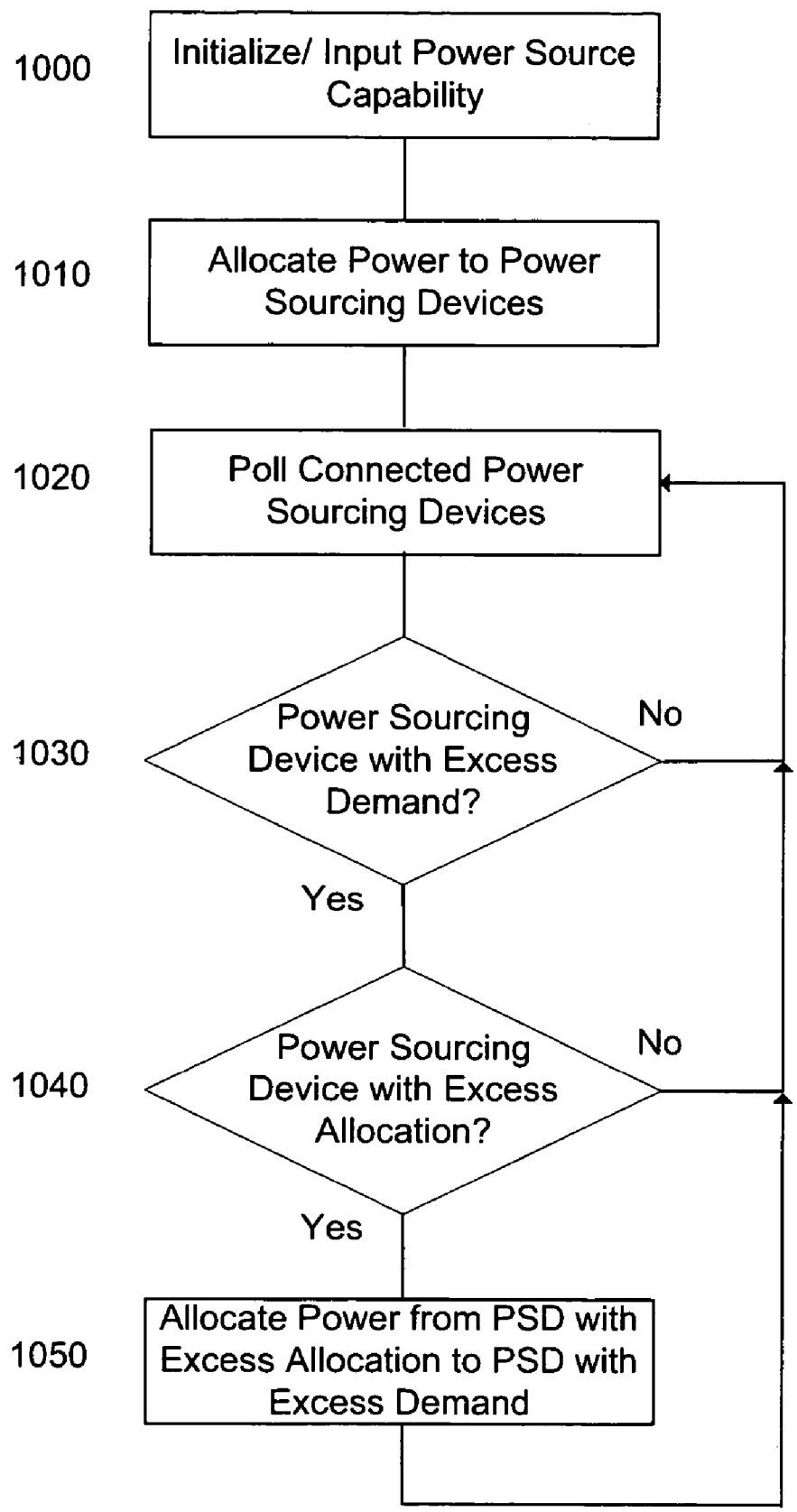
FIG. 5c illustrates a high level flow chart of an embodiment of the operation of the manager of FIG. 5b.

FIG. 5c illustrates a high level flow chart of an embodiment of the operation of the manager 545 of FIG. 5b. In stage 1000 manager 545 initializes and inputs the power capability of power source 310. In one embodiment power source 310 represents a plurality of power sources arranged in a power sharing arrangement. In stage 1010 power is allocated to each PSD 320. In one embodiment all power is allocated equally. In another embodiment, each PSD 320 initializes with a minimum allocated power and allocates power to detected devices up to the default allocated power.

In stage 1020 manager 545 polls each connected PSD 320 and inputs information regarding power demand. In stage 1030 the input information is compared with allocated power according to stage 1010. In the event that in stage 1030 no PSD having power demand in excess of allocated power is found, stage 1020 as described above is repeated.

In the event that in stage 1030 one or more PSD 320 having power demand in excess of allocated power is found, in stage 1040 a PSD having power demand less than allocated power, i.e. an excess allocation is searched for. In the event that no PSD having an excess allocation is found, stage 1020 as described above is repeated.

In the event that in stage 1040 a PSD having an excess allocation is found, in stage 1050 power allocated to the PSD having an excess allocation is reduced and an increase in power allocation is transmitted to a PSD having excess demand as described above in relation to stage 1030. Thus allocated power is removed from a PSD having excess power allocation and transferred to a PSD having excess demand.

The flow chart of FIG. 5c thus reallocates power among PSD 320s of network configuration 540. The above has been described as finding excess power and allocating it to excess demand, however this is not meant to be limiting in any way. In another embodiment, power is allocated according to priority, with priority levels being compared and power allocated among PSDs 320 at the network level by manager 545.

Figure 6:
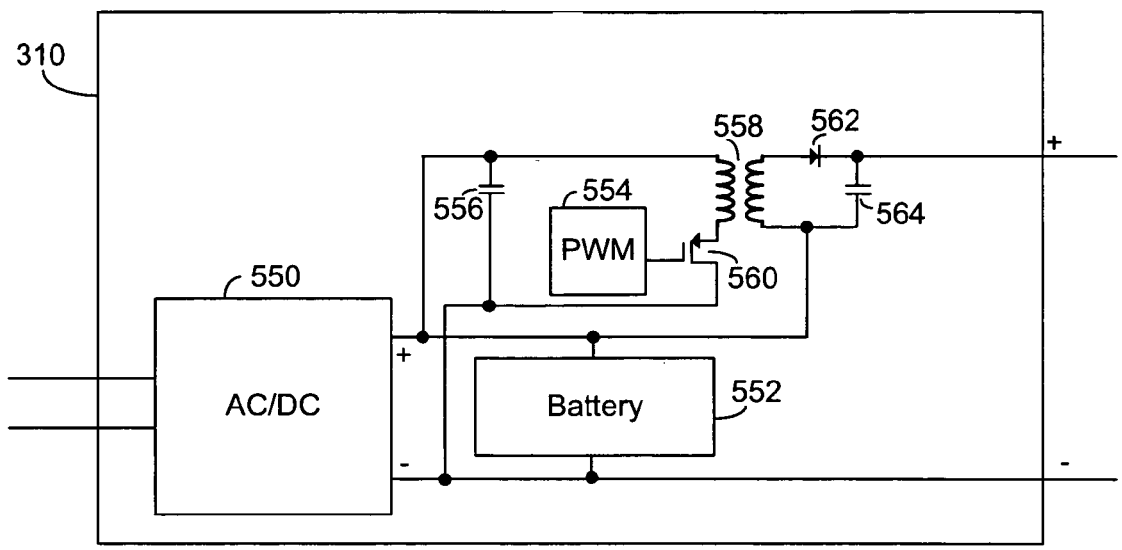
FIG. 6 illustrates a high level block diagram of an embodiment of a power source in accordance with the principle of the current invention.

FIG. 6 illustrates a high level block diagram of an embodiment of a power source 310 in accordance with the principle of the current invention. Power source 310 comprises AC/DC power supply 550, storage battery 552, PWM controller 554, input capacitor 556, FET 560, flyback transformer 558, output diode 562 and output capacitor 564. Storage battery 552 is arranged to receive a charge from the output of AC/DC power supply 550 and supply a reduced voltage in the event of a failure of AD/DC power supply 550. The combination of PWM controller 554, FET 560, input capacitor 556, flyback transformer 558, output diode 562 and output capacitor 564 are arranged to supply an increased output voltage. In the exemplary embodiment shown the voltage increase is minimized, with a base voltage being supplied directly by storage battery 552. PWM controller 554 need only boost the voltage from the output voltage of storage battery 552 to the desired output voltage of power source 310.

Figure 7:
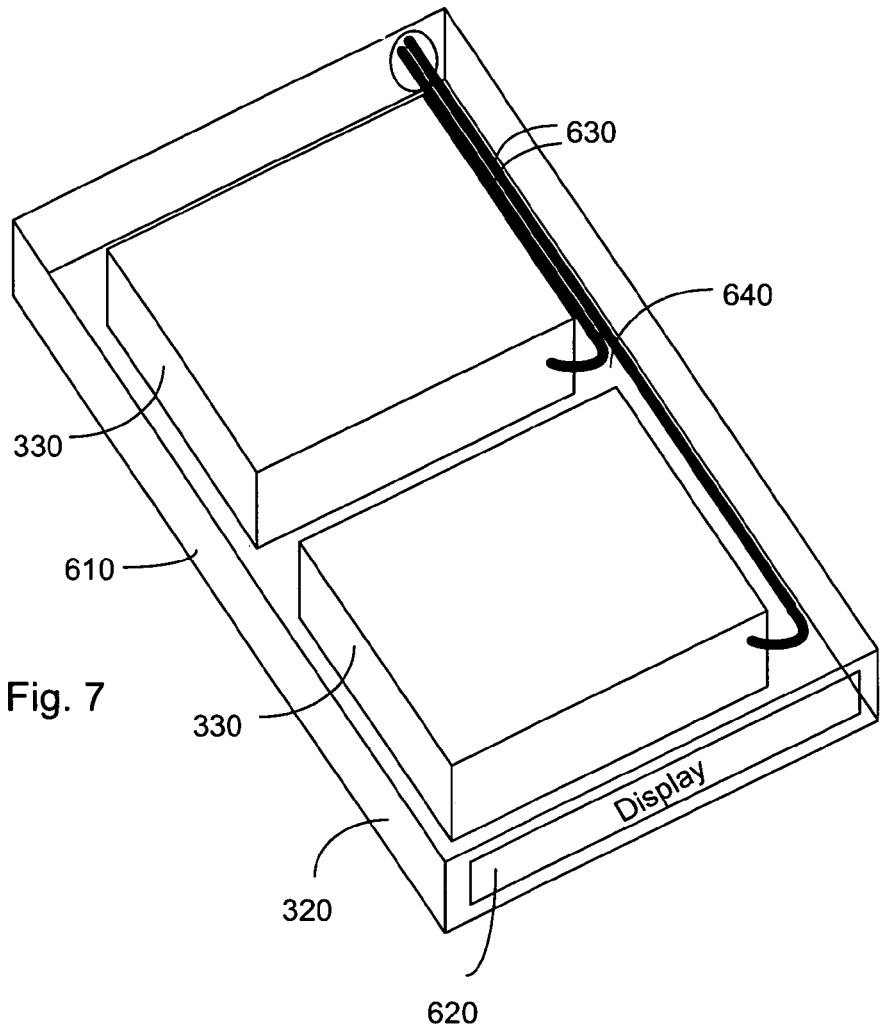
FIG. 7 illustrates a high level layout of high density PSD in accordance with the principle of the current invention.

FIG. 7 illustrates a high level layout of high density PSD 320 in accordance with the principle of the current invention. PSD 320 comprises: a first and second PSE 330, a rack mount chassis 610, a status display 620, and a plurality of cables 630 within a channel 640. In an exemplary embodiment status display 620 comprises one LED for each port supported by PSD 320. In an exemplary embodiment each of first and second PSE 330 support up to 48 ports of powering, and PSE 320 occupies 1 U. A unique feature of the layout of PSD 320 of FIG. 7 is the placing of first and second PSE 330 one behind the other in a single 1 U of space, first and second PSE 330 jointly driving a single display 620. Cables 630 are fed to the rear of rack mount chassis 610 via channels 640 on one or both sides of each PSE 320. Management and control unit 335 is not shown for clarity.

Figure 8A:
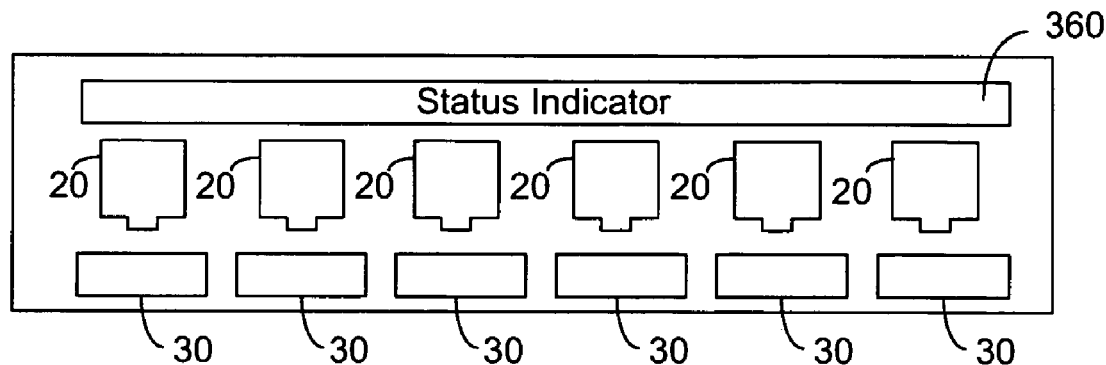
FIG. 8a illustrates a high level front view of a power ready patch panel in accordance with the principle of the current invention.

FIG. 8a illustrates a high level layout of a front view of a power ready patch panel 350 in accordance with the principle of the current invention, comprising status indicator 360, ports 20 for connecting switch/hub equipment and labeling tabs 30. In an exemplary embodiment status indicator 360 comprises an indicator LED for each port 20, the LED being either of a single color or a bi-color LED assembly.

Figure 8B:
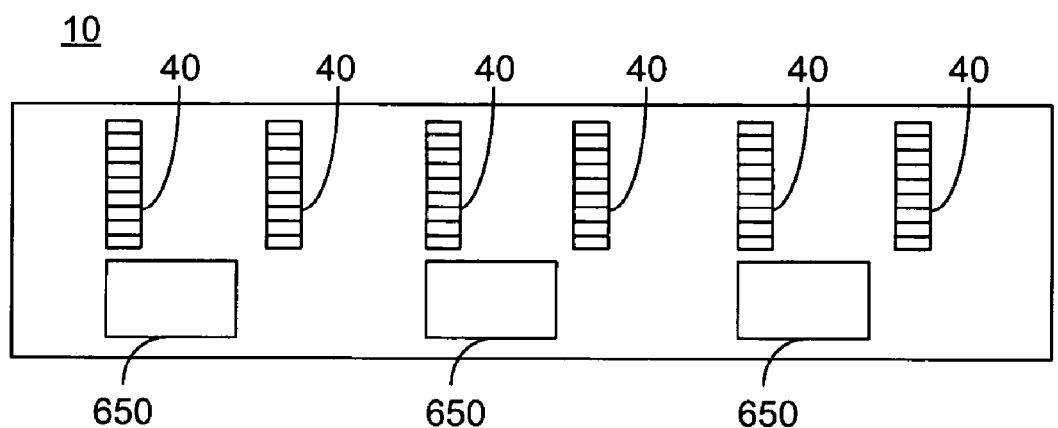
FIG. 8b illustrates a high level rear view of a power ready patch panel in accordance with the principle of the current invention.

FIG. 8b illustrates a high level layout of a rear view of a power ready patch panel 350 as illustrated in FIG. 8a in accordance with the principle of the current invention comprising providing a plurality of ports 40 and sockets 650. Sockets 650 preferably detachably connect PSD 320 to power ready patch panel 350. In an exemplary embodiment a single socket 650 receives power, status information and optional transfers a type indication for a plurality of ports 20, 40. In another embodiment, each socket 650 is associated with a unique port 20, 40. In yet another embodiment, each socket 650 is associated with a group of ports 20, 40.

Figure 9:
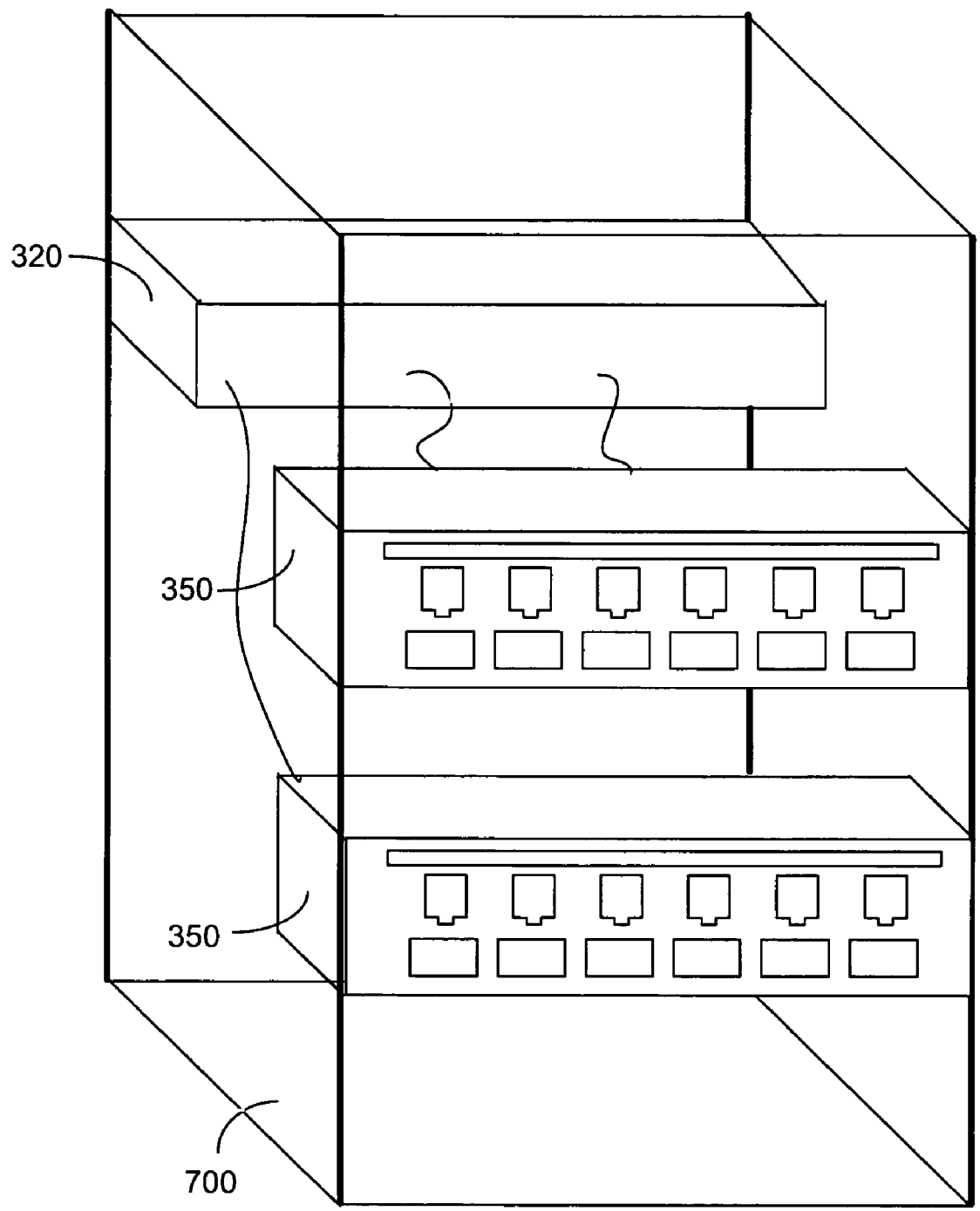
FIG. 9 illustrates a first high level layout of an equipment rack comprising a plurality of power sourcing devices and power ready patch panels in accordance with the principle of the current invention.

FIG. 9 illustrates a first high level layout of an equipment rack 700 comprising a plurality of power ready patch panels 350 and a PSD 320. A single PSD 320 is shown for clarity, however this is not meant to be limiting in any way. A plurality of power sourcing devices may be utilized in a single rack without exceeding the scope of the invention. It is to be noted that PSD 320 is mounted towards the rear of equipment rack 700 thus saving rack space. Power ready patch panels 350 are mounted towards the front of equipment rack 700, and thus a power ready patch panel 350 and PSD 320 can occupy a single horizontal location. Thus a single 1 U space exhibits increased density functionality in that both PSD 320 and power ready patch panel 350 can occupy 1 U of space.

Figure 10:
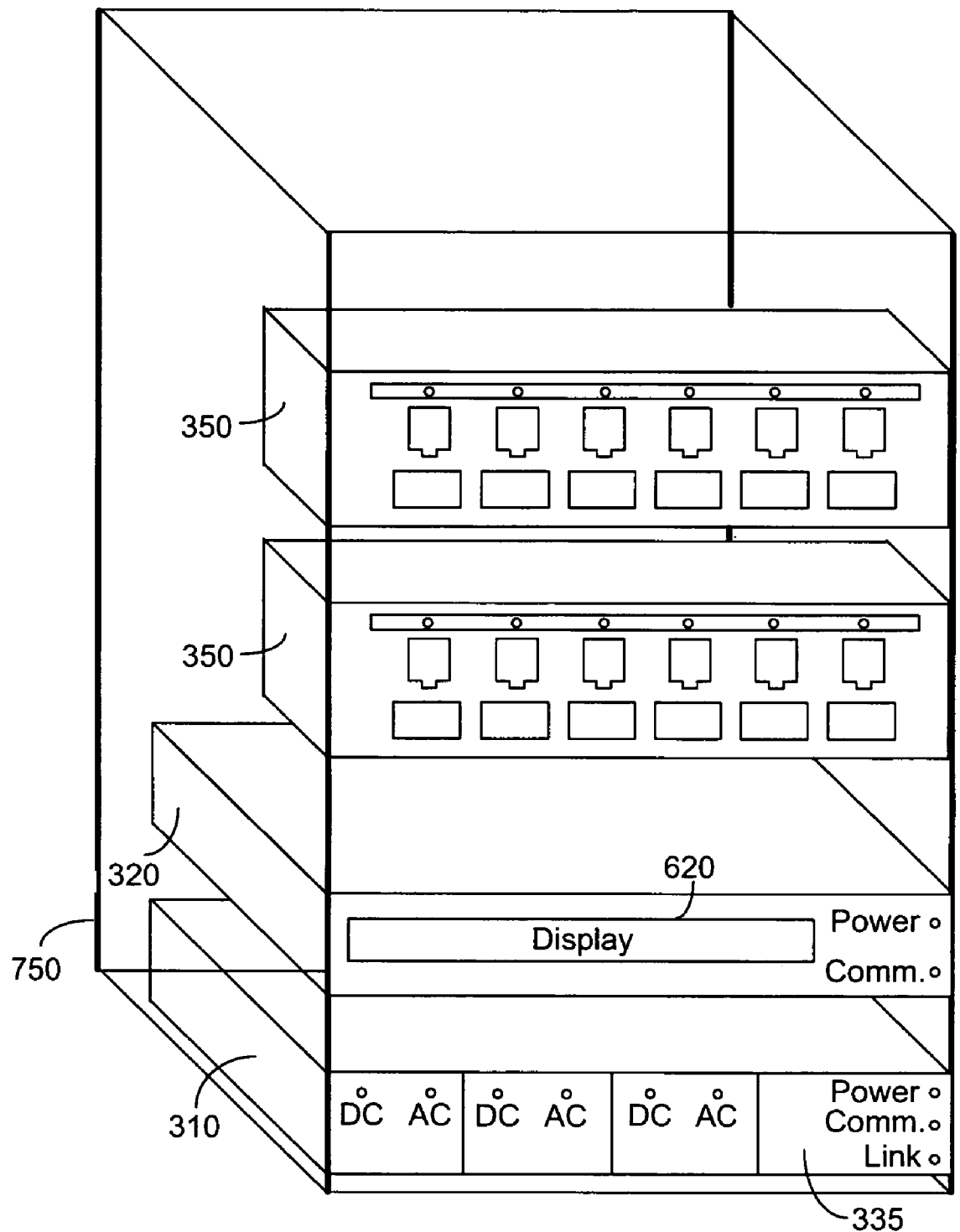
FIG. 10 illustrates a second high level layout of an equipment rack comprising a plurality of power sourcing devices and power ready patch panels in accordance with the principle of the current invention.

FIG. 10 illustrates a second high level layout of an equipment rack 750 comprising a plurality of power ready patch panels 350, a PSD 320 exhibiting a display 620, and a power source 310 exhibiting a management and control unit 335. A single PSD 320 and power source 310 are shown for clarity, however this is not meant to be limiting in any way. A plurality of power sources, and a plurality of PSDs may be utilized in a single rack without exceeding the scope of the invention. Power source 310 is shown as comprising three separate power sources arranged on a single shelf, with a fourth slot comprising management and control unit 335. Management and control unit 335 is at least partially located on a separate shelf from PSD 320. Management and control unit 335 exhibits indicators for power, communication with the PSDs 320 and a link, preferably with one of an NMS control and an Ethernet link. PSD 320 exhibits a display indicating status display 620. Status display 620 preferably exhibits information regarding the operation of all sub-units of PSD 320.

In an exemplary embodiment management and control unit 335 controls the operation of each PSD 320, including supplying an allocation of power for each PSD 320. Each PSD 320 is operative in response to the allocation received from management and control unit 335 to output current controlled power for powering of PDs via power ready patch panels 350. The number of PDs to be powered is at least partially a function of the power allocation received from management and control unit 335. Power management functionality is thus provided on a rack level for the plurality of PSDs.

Figure 11:
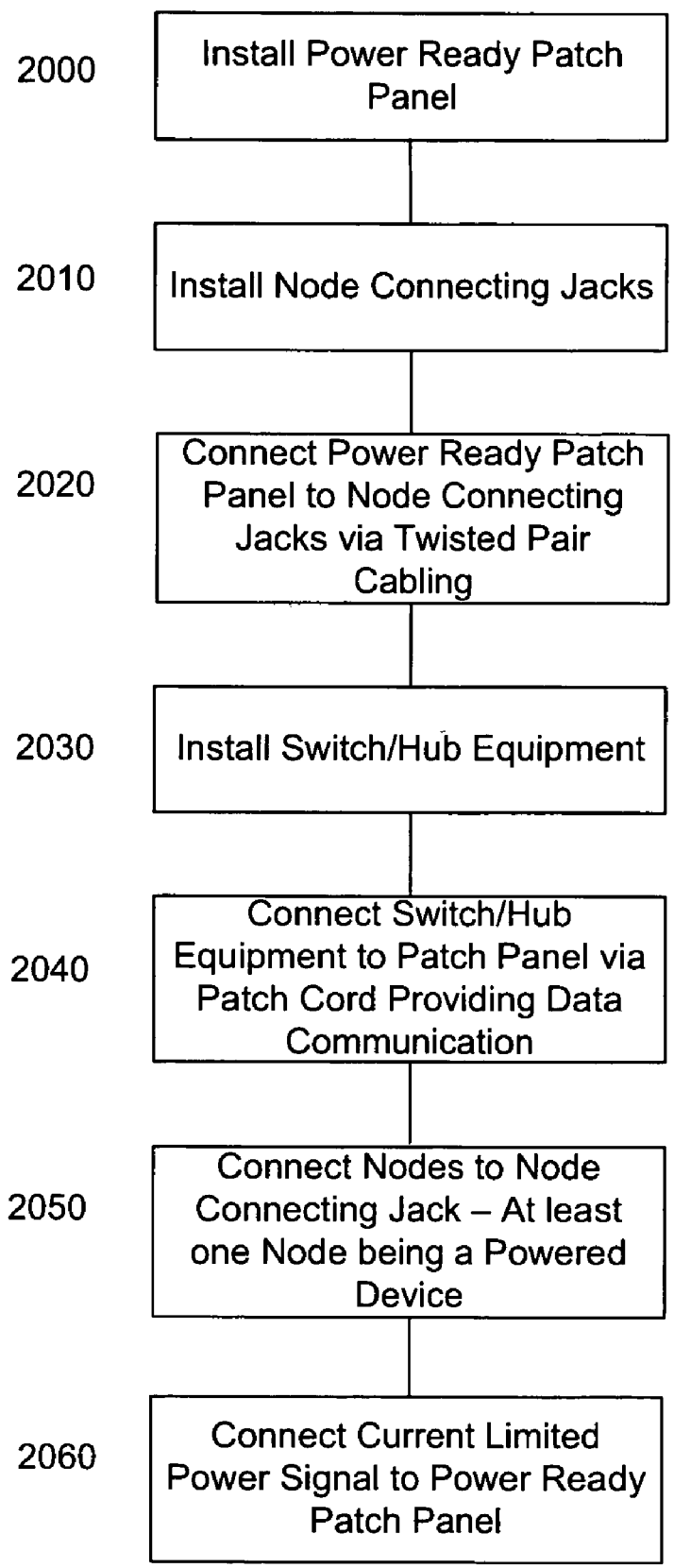
FIG. 11 illustrates a high flow chart of the steps in flexibly providing power via a power ready patch panel in accordance with the principle of the current invention.

FIG. 11 illustrates a high flow chart of the steps in flexibly providing power via a power ready patch panel in accordance with the principle of the current invention. In stage 2000, a power ready patch panel is installed. Typically, such a power ready patch panel is installed in one of a communications room and a consolidation point in accordance with TIA/EIA 568, and is installed at the time of infrastructure installation. In stage 2010, a plurality of node connecting jacks are installed, typically at least one node connecting jack is installed in a wall mount location where a node is expected to be connected. In stage 2020, each of the plurality of node connecting jacks installed in stage 2010 is connected via a node connecting cable to a unique port of the power ready patch panel installed in stage 2000. The node connecting cable is also known as horizontal cabling, and comprises a plurality of twisted wire pairs for carrying both data, and optionally power.

In stage 2030, switch or hub equipment is installed, preferably in a communications room. In stage 2040 a data communication path is established by the use of patch cords connecting specific ports of the switch or hub equipment to specific ports of the power ready patch panel installed in stage 2000. In stage 2050, a node is connecting to any node connecting jack installed in stage 2010. The node so installed is thus in data communication with the switch or hub equipment installed in stage 2030 via the patch cords installed in stage 2040. A plurality of nodes may be thus be connected and be in data communication via the switch or hub equipment. In prior art systems, such as the system of FIG. 3, in order to supply power over the communication cabling, a midspan unit needs to be installed. Such an installation requires disturbing the patch cord wiring, and may lead to unintended loss of data communication.

In stage 2060, advantageously, at least one current limited power signal is detachably connected to the power ready patch panel installed in stage 2000, thereby supplying power for a specific node connected via a node connecting jack and communication cabling to power ready patch panel. Preferably, the current limited power signal is supplied by a PSE having a plurality of outputs, and associated with each output is display information for the power ready patch panel. Thus, power is connected to any of a plurality of node connecting jacks without disturbing data communication, without adjusting the patch cords carrying data, and without requiring installation of powering equipment at an infrastructure installation phase.

Thus, the present embodiments enable a system for powering nodes over structured cabling by providing a power ready patch panel and a PSD. The PSD outputs a current limited power for each node to be powered and provides interrogation, optional classification, power management and optional reporting, preferably in conformity with IEEE 802.3af. In an exemplary embodiment, a plurality of PSDs provide power for a plurality of power ready patch panels, and at least one PSD provides rack level power management. The power ready patch panel preferably comprises a connection for receiving power from the power sourcing device, a plurality of ports for connecting switch/hub equipment, a plurality of ports for connecting nodes and a status indicator for each port. Each port for connecting switch/hub equipment is associated with a unique port for connecting a node. Preferably, the power ready patch panel further provides a type indication for each port or group of ports as defined by the connection to the PSD, the type indication being for connection to the associated PSD. The type indication is representative of the powering type of the port, and in an exemplary embodiment may be indicative of spare pair powering, data pair powering, a combination of spare pair powering and data pair powering, or the port being disabled. In another embodiment the type of port powering further comprises personalization information indicative of vendor specific features to be supported by the PSD in cooperation with the power ready patch panel. In another embodiment the type indication may be representative of a priority of the associated port or group of ports, the priority being determined by a prioritization algorithm.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description and which are not in the prior art.

We claim:

1. A power ready patch panel comprising:
 a plurality of means for receiving a current limited power signal, each of said means receiving a unique current limited power signal;
 a plurality of means for connecting one end of a cable, the cable comprising a plurality of twisted wire pairs, each of the cables providing a data communication and power path to a particular node connecting jack;
 a plurality of connectors each for connecting one end of a patch cable, said plurality of connectors being each operatively connected by pairs of conductors to a unique one of said plurality of means for connecting one end of a cable to allow for data communication between said patch cables and said cables; and
 a plurality of means for injecting said received current limited power signal onto at least one of said pairs of conductors.

2. A power ready patch panel according to claim 1, further comprising a status indicator indicating a status of power delivery via said current limited power signal.

3. A power ready patch panel according to claim 2, wherein said status indicator comprises at least one LED associated with each of said plurality of means for connecting one end of a cable.

4. A power ready patch panel according to claim 2, wherein said status indicator displays an indication of at least one of power supplied to a node connected to the node connecting jack, an overload condition, and a short circuit condition.

5. A power ready patch panel according to claim 1, wherein at least one of said plurality of means for connecting one end of a cable comprises one of a 66 punch down, 110 punch down, BIX punch down, a Krone IDC and an 8 contact insulation displacement connector.

6. A power ready patch panel according to claim 1, wherein at least one of said plurality of connectors for connecting one end of a patch cable comprises an RJ-45 socket.

7. A power ready patch panel according to claim 1, meeting the definition of connecting hardware according to the TIA/EIA 568 standard.

8. A power ready patch panel according to claim 7, wherein the power ready patch panel performs in accordance with one of category 5, category 5e and category 6 requirements of said TIA/EIA 568 standard.

9. A power ready patch panel according to claim 1, wherein at least one of said means for injecting comprises one of a transformer and an inductor.

10. A power ready patch panel according to claim 1, wherein at least one of said received current limited power signals is injected by the respective means for injecting onto pairs of conductors not utilized for data communication.

11. A power ready patch panel according to claim 1, wherein at least one of said received current limited power signals is injected by the respective means for injecting onto pairs of conductors utilized for data communication.

12. A power ready patch panel according to claim 1, further comprising a type indicator operable to indicate a type of operation to a source of said received plurality of current limited power signals.

13. A power ready patch panel according to claim 12, wherein said type indicator comprises a pre-determined resistance, said type of operation being detectable from the value of said pre-determined resistance.

14. A power ready patch panel according to claim 12, wherein said type of operation comprises at least one of spare pair powering, data pair powering, a combination of data pair and spare pair powering, a disabled condition and a priority.

15. A power ready patch panel according to claim 12, wherein said type of operation comprises an indication of vendor specific features to be supported by the source of said plurality of current limited power signals.

16. A power ready patch panel according to claim 1, wherein at least two of said plurality of means for receiving a current limited power are constituted of a single detachable connector.

17. A power ready patch panel according to claim 1, wherein the current limited power signals are in accordance with IEEE 802.3af.

18. A system for providing power over Ethernet comprising:

a power sourcing device, said power sourcing device providing a plurality of current limited power signals; and
a power ready patch panel detachably connected to at least one of said plurality of current limited power signals, said power ready patch panel comprising:
  a plurality of ports for connecting a node connecting cable, the node connecting cable comprising a plurality of twisted wire pairs providing a data communication and power path to a particular node connecting jack;
  a plurality of ports for connecting a patch cable, each of said plurality of ports for connecting a patch cable being associated with a unique one of said plurality of ports for connecting a node connecting cable; and
  an operative connection between said detachably connected at least one current limited power signal and at least one of said plurality of ports for connecting a node connecting cable.

19. A system according to claim 18, further comprising a means for indicating a status of said connected at least one current limited power signal.

20. A system according to claim 19, wherein said means for indicating status comprises at least one LED associated with each of said plurality of ports for connecting a node connecting cable.

21. A system according to claim 18, further comprising a status indicator indicating a status for each of said plurality of ports for connecting a node connecting cable, said status indicator displaying an indication of at least one of power supplied, no power supplied, an overload condition and a short circuit condition.

22. A system according to claim 18, wherein each of said plurality of ports for connecting a node connecting cable comprises one of a 66 punch down, 110 punch down, BIX punch down, a Krone IDC and an 8 contact insulation displacement connector.

23. A system according to claim 18, wherein each of said plurality of ports for connecting a patch cable comprises an RJ-45 socket.

24. A system according to claim 18, wherein said power ready patch panel meets the definition of connecting hardware according to the TIA/EIA 568 standard.

25. A system according to claim 24, wherein said power ready patch panel performs in accordance with one of category 5, category 5e and category 6 requirements of said TIA/EIA 568 standard.

26. A system according to claim 18, further comprising one of a transformer and an inductor, said operative connection comprising said one of a transformer and an inductor.

27. A system according to claim 18, wherein said operative connection connects said connected at least one current limited power signal to twisted wire pairs of the node connecting cable not providing a data communication path.

28. A system according to claim 18, wherein said operative connection connects said connected at least one current limited power signal to twisted wire pairs of the node connecting cable providing a data communication path.

29. A system according to claim 18, wherein said power ready patch panel further comprises a type indicator operable to indicate a type of operation to said power sourcing device.

30. A system according to claim 29, wherein said type indicator comprises a pre-determined resistance detectable by said power sourcing device, said type of operation being encoded by the value of said pre-determined resistance.

31. A system according to claim 29, wherein said type of operation comprises at least one of spare pair powering, data pair powering, a combination of data pair and spare pair powering, a disabled condition and a priority.

32. A system according to claim 29, wherein said type of operation comprises an indication of vendor specific features, said power sourcing device being operable to deliver said vendor specific feature in accordance with said indication.

33. A system according to claim 18, further comprising a plurality of detachable connections between said power sourcing device and said power ready patch panel, each of said plurality of detachable connections being associated with a unique one of said plurality of current limited power signals, wherein at least two of said plurality of connections are at least partially constituted of a single detachable connector.

34. A system according to claim 18, wherein said power sourcing device is operable in accordance with IEEE 802.3af.

35. A power sourcing device for use with a power ready patch panel, the power sourcing device comprising:
  a plurality of current limited power signals; and
  an output signal providing display information regarding each of said plurality of current limited power signals.

36. A power sourcing device according to claim 35, wherein said information comprises one of an overload condition, a normal power supply condition, and a short circuit condition.

37. A power sourcing device according to claim 35, further comprising a type indication receiver operable to obtain a type of operation of the power ready patch panel.

38. A power sourcing device according to claim 37, wherein said type of operation is at least one of: spare pair powering; data pair powering; a combination of data pair and spare pair powering; a disabled condition; and a priority, the power sourcing device being operable responsive to said obtained type operation.

39. A power sourcing device according to claim 37, wherein said type indication is indicative of vendor specific features, the power sourcing device being operable in accordance with said indication.

40. A power sourcing device according to claim 35, wherein said plurality of current limited power signals are each in accordance with IEEE 802.3af.

41. A power sourcing device according to claim 35, wherein said output signal is sufficient to display said display information on a supplied display.

42. A method of powering nodes in a data network, the method comprising:
  detachably receiving a current limited power signal;
  connecting one end of a cable comprising a plurality of twisted wire pairs, the cable providing a data communication path to a node connecting jack;
  connecting one end of a patch cable to provide data communication for said node connecting jack;
  operatively connecting said connected one end of a patch cable to said connected one end of a cable;
  operatively connecting said detachably received current limited power to said connected one end of a cable thereby providing power to the node;
  providing a source of said detachably received current limited power signal;
  signaling a type indication to said provided source; and
  operating said provided source responsive to said signaled type indication.

43. A method according to claim 42, further comprising indicating a status of said received current limited power signal.

44. A method according to claim 43, wherein said status is at least one of power supplied towards said node connecting jack, no power supplied towards said node connecting jack, an overload condition and a short circuit condition.

45. A method of flexibly providing power in a structured cabling system, the method comprising:
- providing a source of a plurality of current limited power signals;
- providing a power ready patch panel, said power ready patch panel providing detachable connections for said plurality of current limited power signals, said power ready patch panel further exhibiting a plurality of ports for connecting a node connecting cable and a plurality of ports for connecting a patch cable, each of said plurality of ports for connecting a patch cable being operatively connected via pairs of conductors to a unique one of said plurality of ports for connecting a node connecting cable, each of said detachable connections being operatively connected to inject said detachably connected current limited power signal to at least one of said pairs of conductors;
- connecting each of said plurality of ports for connecting a node connecting cable of said provided power ready patch panel to a unique node connecting jack;
- connecting each of said plurality of ports for connecting a cable to a data communication path thereby providing data communication for a node connected to said node connecting jack; and
- detachably connecting said providing plurality of current limited power signals to said detachable connection, thereby providing power to the node connected to said node connecting jack without affecting data communication.

* * * * *